A. W. CASH.
PRESSURE REDUCING AND REGULATING VALVE.
APPLICATION FILED JUNE 29, 1917.

1,286,872. Patented Dec. 3, 1918.

INVENTOR
Arthur W Cash
LaPonte & Bean
ATT'YS

UNITED STATES PATENT OFFICE.

ARTHUR W. CASH, OF DECATUR, ILLINOIS, ASSIGNOR TO A. W. CASH COMPANY, OF DECATUR, ILLINOIS, A CORPORATION OF ILLINOIS.

PRESSURE REDUCING AND REGULATING VALVE.

1,286,872.

Specification of Letters Patent.

Patented Dec. 3, 1918.

Application filed June 29, 1917. Serial No. 177,781.

*To all whom it may concern:*

Be it known that I, ARTHUR W. CASH, a citizen of the United States, a resident of Decatur, in the county of Macon and State of Illinois, have invented new and useful Improvements in Pressure Reducing and Regulating Valves, of which the following is a specification.

My invention relates to improvements in pressure reducing and regulating valves, used to control and regulate the pressure of fluids flowing through pipes or conduits, and more especially, to that class of regulating valves known as "auxiliary" operated valves, such as disclosed and claimed in my prior Patent Number 1,180,108, issued April 18, 1916, on which this invention is an improvement.

The principal object of this invention is a valve of this type in which the parts subjected to wear, may be readily replaced, the valve being positive and efficient in operation and especially adapted for the use of steam and other hot fluids, although it may be used with fluids of any character.

To the accomplishment of the foregoing, and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims without digressing from my inventive idea.

Figure 1:
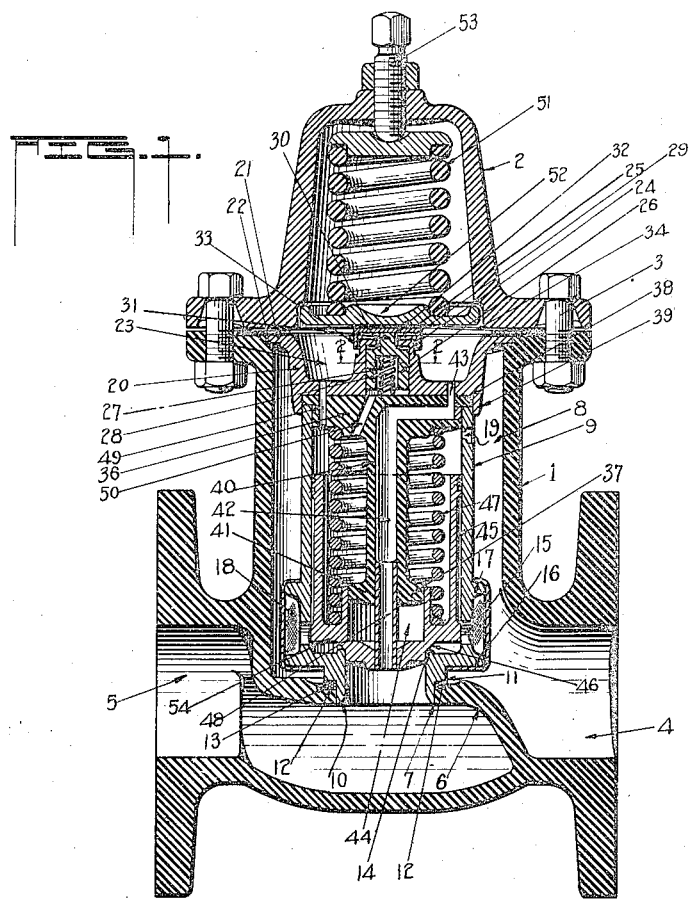
Figure 1 represents a longitudinal vertical section through a valve, constructed according to my invention.

Referring now to the drawing, the numeral 1 designates the main body casing, and 2 the spring chamber casing, which are held together by means of the nut and bolt connections 3, as shown. The main body casing 1 is provided with the inlet 4 and outlet 5, separated by the partition or division wall 6, having an opening 7 therethrough. The main body casing is provided with the cylindrical portion 8 in communication with the inlet 4. Mounted in this cylindrical portion 8 is the renewable piston cylinder 9, having its lower extremity reduced as at 10 to provide the shoulder 11 to fit and confine the packing 12 in the annular groove 13 around the opening 7 in the partition or division wall. This piston cylinder is also provided with the seat 14 and the plurality of openings 15 communicating with the inlet chamber and located between the annular flanges 16 and 17 on the outside of said piston cylinder, which annular flanges are embraced by and retain the removable or renewable screen 18. Near its upper end, the piston cylinder is provided with the restricted port 19.

Figure 2:
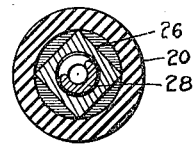
Fig. 2 represents a horizontal section taken on line 2—2 of Fig. 1 on an enlarged scale, showing the cross sectional shape of the auxiliary valve; and, Fig. 3 is a top plan view of the recessed stud or projection in which the auxiliary valve is mounted.
Figure 3:
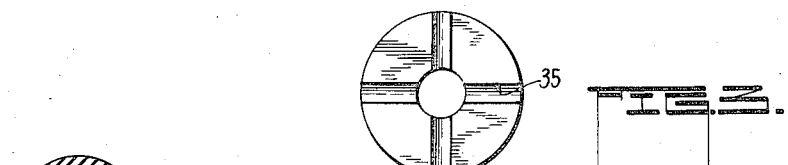

This piston cylinder is held in position by means of the cap member 20 which has the annular flange 21 resting on the shoulder 22 in the upper end of the cylindrical part 8 of the main body casing, part of the spring chamber casing 2 engages this annular flange 21 to hold the cap member 20 in position, a suitable packing being interposed to prevent leakage. This cap member 20 is recessed to form an annular chamber 23 and is also provided with the port or passage 24 having the smaller opening 25 and receiving the renewable auxiliary valve 26. This valve is poly-sided in cross-section as shown in Fig. 2 so as to permit the passage of the fluid up along its sides and is provided with the socket 27 to receive the coil spring 28 which normally holds the inclined seating portion 29 against the seat 30 formed by the restricted opening 25, and having the reduced neck portion 31 extending therethrough so as to engage the baffle cap member 32 which rests thereon, and has the annular side flange 33 fitting over the sides of the recessed portion of the cap member 20. This provides a baffle so that the fluid discharged through the port will not impinge upon and injure the removable diaphragms 34 which are held in place by the nut and bolt connections. The top of the recessed part of the cap member 20 is grooved as at 35, see Fig. 3, so as to permit the passage of the fluid under the baffle cap, when the cap is forced down by spring on the diaphragm.

Mounted between the cap member 20 and the piston cylinder 9, is the head member 36 of the dash-pot piston 37. This head member 36 is provided with the annular shoulder 38 resting on top of the piston cylinder 9 and within the depending annular flange 39 of the cap member 20. This head member is extended downwardly in the form of a shank 40 and is enlarged into the head 41 which is provided with the passage 42 therethrough, leading from the port or passage 43 in the annular compartment 23 in the cap member 20. This piston head 41 fits in the recess or cylinder 44 formed in the lower portion of the removable seat piston 45 which fits within the piston cylinder, and has the valve-seating portion 46 adapted to rest on and imperviously engage the seat 14 formed in the piston cylinder. Coil spring 47 is mounted within this seat piston 45 and engages the under side of the head member 36. A tube 48 connects the outlet or regulated side of the valve body with the passage 42, as shown. Assembling pin 49 is placed in such a position with reference to port 43 that cap 20 cannot be assembled in such a manner as to shut off port. Port or passage 50 affords communication between the interior of the piston cylinder 9 and annular space 23 through the socket or recess 24 when the valve member 26 is open.

The operation of the valve is as follows: As the compression of the spring 51 which rests on the pressure plate 52 which engages the diaphragms as shown, has been adjusted in accordance with the predetermined amount of delivery pressure by means of the adjusting screw 53, the diaphragms 34 will be in their downward position, holding valve 26 open. This will relieve the inlet pressure within the piston cylinder 9 by means of port or passage 50 so that the seat piston 45 will be raised against the pressure of spring 47 due to the inlet pressure against the surface 54. When the pressure of the fluid in the outlet chamber and the annular chamber 23 reaches the predetermined point, it will overcome the pressure of spring 51, forcing the diaphragms 34 upwardly and spring 27 assisted by the initial pressure within piston cylinder 9 will then close valve 26. As the port 19 has a restricted opening, the fluid will pass through port 50 and the auxiliary valve into the annular chamber 23 and out through port 43 faster than it enters the restricted port 19, which drains the fluid from the inside of piston cylinder 9 so as to allow the inlet pressure on the face 54 to raise the seat piston 45 and permit the fluid to pass directly from the inlet to the outlet through the openings 15 and aperture 10, until the reduced and regulated pressure is sufficient to overcome the pressure on spring 51, permitting the auxiliary valve to close and the inlet pressure to pass through port 19 and with the assistance of spring 47, to close the seat piston.

What I claim is:

1. A device of the character described, including in combination, a casing comprising a main body and a spring chamber, the main body being provided with a partition to divide it into inlet and outlet portions, said partition having an aperture therethrough, a piston cylinder removably mounted within said body and fitting said aperture through said partition, said piston cylinder being provided with a seat near its lower end, and also openings communicating with the inlet portion of the body, a seat piston mounted within said piston cylinder and adapted to engage said seat, and means for normally holding said seat piston on said seat, and connections for permitting the initial or inlet pressure to raise said seat piston off its seat when the regulated pressure is reduced below a predetermined point.

2. A device of the character described, including in combination, a casing comprising a main body and a spring chamber, the main body being provided with a partition to divide it into inlet and outlet portions, said partition having an aperture therethrough, a piston cylinder removably mounted within said body and fitting said aperture through said partition, said piston cylinder being provided with a seat near its lower end, and also openings communicating with the inlet portion of the body, and a removable screen mounted on said piston cylinder so as to strain fluid passing through said openings, a seat piston mounted within said piston cylinder and adapted to engage said seat, and means for normally holding said seat piston on said seat, and connections for permitting the initial or inlet pressure to raise said seat piston off its seat when the regulated pressure is reduced below a predetermined point.

3. A device of the character described, including in combination, a casing comprising a main body and a spring chamber, the main body being provided with a partition to divide it into inlet and outlet portions, said partition having an aperture therethrough, a piston cylinder removably mounted within said body and fitting said aperture through said partition, said piston cylinder being provided with a seat near its lower end, and also openings communicating with the inlet portion of the body, a seat piston mounted within said piston cylinder and adapted to engage said seat, and means for normally holding said seat piston on said seat, a cap member for said piston cylinder having a passage therethrough with an auxiliary valve mounted therein, means for normally holding said auxiliary valve closed, said cap member having a compartment always in communication with the regulated pressure, a spring controlled diaphragm positioned above said cap member and actuating said auxiliary valve, the passage controlled by said auxiliary valve being in communication with the inlet pressure.

4. A device of the character described, including in combination, a casing comprising a main body and a spring chamber, the main body being provided with a partition to divide it into inlet and outlet portions, said partition having an aperature therethrough, a piston cylinder removably mounted within said body and fitting said aperture through said partition, said piston cylinder being provided with a seat near its lower end, and also openings communicating with the inlet portion of the body, a seat piston mounted within said piston cylinder and adapted to engage said seat, and means for normally holding said seat piston on said seat, a cap member for said piston cylinder having a passage therethrough with an auxiliary valve mounted therein, said passage and said valve being of different shapes in cross section so that when the valve is off its seat, fluid will pass through the passage along the sides of the valve, means for normally holding said auxiliary valve closed, said cap member having a compartment always in communication with the reduced and regulated pressure, a spring loaded diaphragm positioned above said cap member and actuating said auxiliary valve, the passage controlled by said auxiliary valve being in communication with the inlet pressure.

5. A device of the character described, including in combination, a casing comprising a main body and a spring chamber, the main body being provided with a partition to divide it into inlet and outlet portions, said partition having an aperature therethrough, a piston cylinder removably mounted within said body and fitting said aperture through said partition, said piston cylinder being provided with a seat near its lower end, and also openings communicating with the inlet portion of the body, a seat piston mounted within said piston cylinder and adapted to engage said seat, and means for normally holding said seat piston on said seat, a cap member for said piston cylinder having a passage therethrough with an auxiliary valve mounted therein, means for normally holding said auxiliary valve closed, said cap member having a compartment always in communication with the reduced and regulated pressure, a spring loaded diaphragm positioned above said cap member, said auxiliary valve member extending through said passage, a baffle cap mounted on the extension of said valve member and engaging said diaphragm, whereby the diaphragm will control the movement of the auxiliary valve, the passage controlled by said auxiliary valve being in communication with the inlet pressure.

6. A device of the character described, including in combination, a casing, comprising a body and a spring chamber, a diaphragm mounted therebetween, a spring in said spring chamber for affording regulated pressure against one side of the diaphragm, said body being provided with a partition to form inlet and outlet portions and said partition being provided with an opening therethrough, a piston cylinder mounted in the inlet portion of said body with its lower end fitting the edge of the partition around the opening therethrough, said piston cylinder having a seat, and also a plurality of openings communicating with the inlet portion of the body, a seat piston mounted within said cylinder and having a portion adapted to fit the seat in said cylinder and means for normally holding said seat piston on its seat, a dash-pot construction within said seat piston, and an auxiliary valve engaging the diaphragm for controlling the operation of the seat piston.

7. A device of the character described, including in combination, a casing, comprising a body and a spring chamber, a diaphragm mounted therebetween, a spring in said spring chamber for affording regulated pressure against one side of the diaphragm, said body being provided with a partition to form inlet and outlet portions and said partition being provided with an opening therethrough, a piston cylinder mounted in the inlet portion of said body with its lower end fitting the edge of the partition around the opening therethrough, said piston cylinder having a seat, and also a plurality of openings communicating with the inlet portion of the body, a seat piston mounted within said cylinder and having a portion adapted to fit the seat in said cylinder and means for normally holding said seat piston in its seat, a cap member for said piston cylinder having a compartment and also having a recess and passage, an auxiliary valve mounted in said recess and passage and actuated by said diaphragm, a passage through said seat piston, placing the said compartment in direct communication with the outlet portion of the body, and said recess and passage in the cap member having communication with the inlet side of the body.

8. A device of the character described, including in combination, a casing, comprising a body and a spring chamber, a diaphragm mounted therebetween, a spring in said spring chamber for affording regulated pressure against one side of the diaphragm, said body being provided with a partition to form inlet and outlet portions and said partition being provided with an opening therethrough, a piston cylinder mounted in the inlet portion of said body with its lower end fitting the edge of the partition around the opening therethrough, said piston cylinder having a seat, and also a plurality of openings communicating with the inlet portion of the body, a seat piston mounted within said cylinder and having a portion adapted to fit the seat in said cylinder and means for normally holding said seat piston on its seat, a cap member for said piston cylinder having a compartment and also having a recess and passage, an auxiliary valve mounted in said recess and passage and actuated by said diaphragm, said cap member having a depending portion provided with a passage communicating with said compartment, and a connection between the passage in the depending portion and the outlet portion of the body, said connection passing through the seat piston, and said recess and passage in the cap member having communication with the inlet side of the body.

9. A device of the character described, including in combination, a casing, comprising a body and a spring chamber, a diaphragm mounted therebetween, a spring in said spring chamber for affording regulated pressure against one side of the diaphragm, said body being provided with a partition to form inlet and outlet portions and said partition being provided with an opening therethrough, a piston cylinder mounted in the inlet portion of said body with its lower end fitting the edge of the partition around the opening therethrough, said piston cylinder having a seat, and also a plurality of openings communicating with the inlet portion of the body, a seat piston mounted within said cylinder and having a portion adapted to fit the seat in said cylinder and means for normally holding said seat piston on its seat, a cap member for said piston cylinder having a compartment and also having a recess and passage, an auxiliary valve mounted in said recess and passage and actuated by said diaphragm, said cap member having a depending portion provided with a passage communicating with said compartment, said depending portion being provided with a head to form a piston, said seat piston being provided with a socket for said head so as to form a dash-pot construction, a connection passing through said seat piston to connect the passage through the depending extension of the cap to the outlet portion of the body, and said recess and passage in the cap also having communication with the inlet side of the body.

10. A device of the character described, including in combination, a casing having a body portion and a spring chamber, a diaphragm mounted between said portions of the casing, a spring in said spring chamber for affording regulated pressure against the diaphragm, said body portion of the casing being provided with a partition, dividing it into inlet and outlet portions, said partition having a passage therethrough, a piston cylinder mounted within the inlet portion of said body and fitting the partition about said passage therethrough, said piston cylinder having a plurality of openings near its lower end communicating with the inlet and also having a valve seat, said piston cylinder also having a restricted port near its upper end, a cap member for said piston cylinder positioned between said spring chamber portion and body portion of the casing and having a compartment therein and also a recess and passage therethrough, a seat piston mounted within said piston cylinder and having its lower end adapted to fit the seat in said piston cylinder, and also provided with a socket forming a cylinder of a dash-pot construction, a head member mounted between said cap and said piston cylinder and having a depending extension provided with a head fitting said socket in the seat piston so as to form the piston of the dash-pot construction, a spring engaging said head and said seat piston for normally holding the seat piston on its seat, an auxiliary valve mounted in the recess in the cap, a spring engaging the head member and auxiliary valve for normally causing the auxiliary valve to close the passage through said cap, said auxiliary valve being actuated by said diaphragm, said head member having a passage to afford continuous communication between the recess in the cap in which the auxiliary valve is positioned and the interior of the piston cylinder, said cap, head member and depending extension having a continuous passage therethrough, a connection from said last mentioned passage passing through the seat piston so as to afford continuous communication between the compartment in the cap and the outlet side of the body.

ARTHUR W. CASH.